United States Patent [19]

Brown

[11] Patent Number: 5,628,369
[45] Date of Patent: May 13, 1997

[54] MACHINE FOR REVITALIZING GOLF COURSE GREENS

[76] Inventor: Curtis W. Brown, 2600 Gracy Farms #934, Austin, Tex. 78727

[21] Appl. No.: 330,562

[22] Filed: Oct. 28, 1994

[51] Int. Cl.$^6$ ..................................................... A01B 45/02
[52] U.S. Cl. ................................................ 172/22; 111/901
[58] Field of Search ....................................... 111/118, 901, 111/902; 172/21, 22; 47/1 F

[56] References Cited

U.S. PATENT DOCUMENTS

| | | | |
|---|---|---|---|
| 3,140,677 | 7/1964 | Fraser | 111/901 |
| 3,685,468 | 8/1972 | Paige et al. | 172/21 |
| 4,133,274 | 1/1979 | Orth et al. | 172/22 |
| 4,148,362 | 4/1979 | Orth | 172/22 |
| 4,196,678 | 4/1980 | Lore et al. | 111/981 |
| 4,429,647 | 2/1984 | Zinck | 111/118 |
| 4,476,938 | 10/1984 | McKay | 172/22 |
| 5,115,750 | 5/1992 | White et al. | 172/21 |
| 5,437,335 | 8/1995 | Hines, Sr. | 172/22 |

FOREIGN PATENT DOCUMENTS

| | | | |
|---|---|---|---|
| 560655 | 9/1993 | European Pat. Off. | 172/21 |

*Primary Examiner*—Spencer K. Warnick, IV
*Attorney, Agent, or Firm*—Joseph F. Long

[57] ABSTRACT

A machine designed to automatically and economically remove spaced earthen plugs, fracture the soil around holes formed by the plug removal, fill the holes with earthen material and tamp and crimp the grass to provide a revitalized golf green that rapidly returns to a playable surface.

4 Claims, 3 Drawing Sheets

MACHINE FOR REVITALIZING GOLF COURSE GREENS

BACKGROUND OF THE INVENTION

It is desirable for golf course putting greens to consistently have a short healthy grass covering with little packing of the soil. From foot traffic, mowing, and fertilizing, the greens tend to become too packed for healthy grass and proper playing surface. Commonly the greens then must be aerated once or twice during a playing season. Currently this is usually done by tractor pulling a tineing machine to punch holes about 10 inches deep and about 4" apart. Sand or sand soil like mixture is then spread and raked over the greens in order to level and fill the holes left by the tineing machine. This method has several undesirable features including packing under the tractor wheels, hand labor for raking and filling holes, two to three day grass recovery time for the green to be in proper playing condition and a slow but certain build up.

The present invention solves the problems as outlined as follows:

a) a special dual track machine with total weight such as to put less pressure on the grass per square inch than a man walking is equipped to punch holes straight down with a hollow core tine; and b) to eject the core from the tine through a hose to an off the greens container;

c) to fracture the ground around each hole by an air blast as the tine reaches maximum depth;

d) to fill holes automatically by propelling sand in a measured quantity into each hole;

e) to settle, level, and crimp sand in each hole to leave an immediately playable surface.

The machine is so constructed with moving pans properly integrated so that tines are pushed straight down and pulled straight up with no bending moment even though the machine is moving. Further the machine is equipped with sufficient sensors, a microprocessor unit and video display to continuously monitor and display all significant operating parameters of the total unit. The invention as claimed and described provides not only a better way for re-working golf course greens but also reduces manual labor and is a more economical way to return the greens to essentially an immediately playable surface.

SUMMARY OF THE INVENTION

The invention may be summarized as a driveable machine to:

force hollow tines to a desired depth of about 10 inches, air eject the soil through a flexible line, fracture the soil with a burst of air, raise the tines and re-inserts the tines at a spaced interval of about five inches;

fill the holes with an earthen mixture that may include sand, fertilizer, and organic matter;

settle the filling material in each hole and;

crimp the grass to essentially close each hole.

The machine encompasses in the design a means for:

inserting and removing the tines while the machine is moving forward with essentially no binding moment on the tines;

minimizing packing pressure or pressure per square inch exerted on the greens surface by using spring pressure flexing drive tracks;

blowing a measured quantity of earthen fill material in each hole;

co-ordinating speed of the machine to give a desired hole spacing;

sensing and a central processing unit to properly co-ordinate operation of the moving parts of the machine and to continuously display operating parameters including time of operation, forward speed amount of earthen material in the material storage tank, air pressure in air pressure tank, hydraulic oil pressure and similar parameters;

trouble shooting with sensors feeding the central processing unit to display and activate an alarm for equipment malfunction including such malfunctions as a bent tine.

BRIEF DESCRIPTION OF THE INVENTION

DETAILED DESCRIPTION OF THE INVENTION

Figure 1:
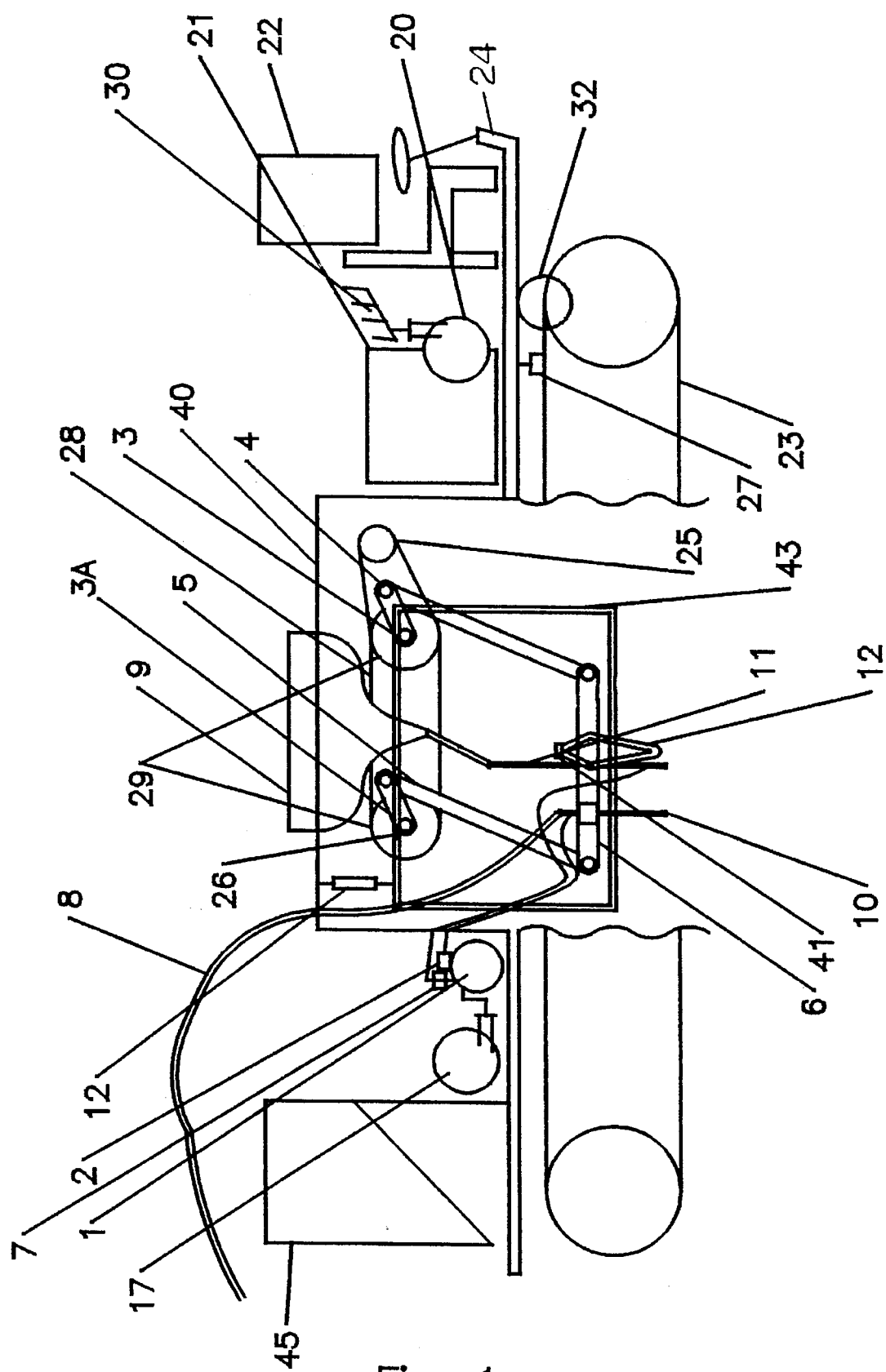
FIG. 1 shows an overall view of the machine.

In FIG. 1 hydraulic wheel motor 32 drives tracks 23 with body or bed 24 mounted between dual tracks 23. Drivers seat 67 is mounted on a forward end of bed 24. Main frame 40 is mounted centrally in the bed 24 between the tracks 23. Mounted in frame 40 we have a moveable fine frame or movable mounting assembly 43 which may be raised and lowered with hydraulic operator. Mounted in frame 43 we have sand hopper or solids material fill tank 9 with outlet flexibly mounted 13 to sand refill tube 11; dual crankshafts 3 and 3a with a minimum of four approximately 5 inch throws rotatable to drive connecting rods 5 connected to said throws to raise and lower tine drive bars 6 with each revolution; each of tine drive bars 6 connected with tines 10; tines 10 are each connected to air reservoir 1 mounted on bed 24 through air solenoid 2 and to core exhaust hose 8. Tine bar raceway guide pin 19 FIG. 2 moves in raceway 12. As tine 10 moves downward the earthen core is expelled through hose 8. The expelled earth may be held in tank 45 or blown off the green. Hydraulic motor 25 also mounted in frame 43 rotates shafts 3 and 3a using chain drive 28 and dual sprockets 29 which are rigidly fastened to shafts 3 and 3a. All raceways 12 are rigidly connected at raceway mounting bar 41 to moveable tine drive frame 43. Air compressor 17 which is mounted on bed 24 maintains pressure in storage tank 7. RPM sensor 26 mounted in frame 43 to measure rotational speed of shafts 3 and 3a and forward motion sensor 27 mounted to body or bed 24 measures speed of tracks 23 and sends signals to central processing unit (CPU) 33 and control panel 22, FIG. 3. Also mounted on frame 24 is the vehicle power plant 21. This power plant is preferably a natural gas driven motor. Hydraulic pump 20 driven by said power plant 21 furnishes power through solenoid valves 30 to drive the machine through hydraulic motors 32, to operate hydraulic lift 13, to operate crankshaft hydraulic drive motors 25, etc. Forward speed may be manually controlled and the CPU, discussed under FIG. 3, operates through input from crankshaft speed sensor 26 and forward motion speed sensor 27 to coordinate the two speeds in order that tines 10 punch holes in the ground at approximately five inch intervals.

Figure 2:
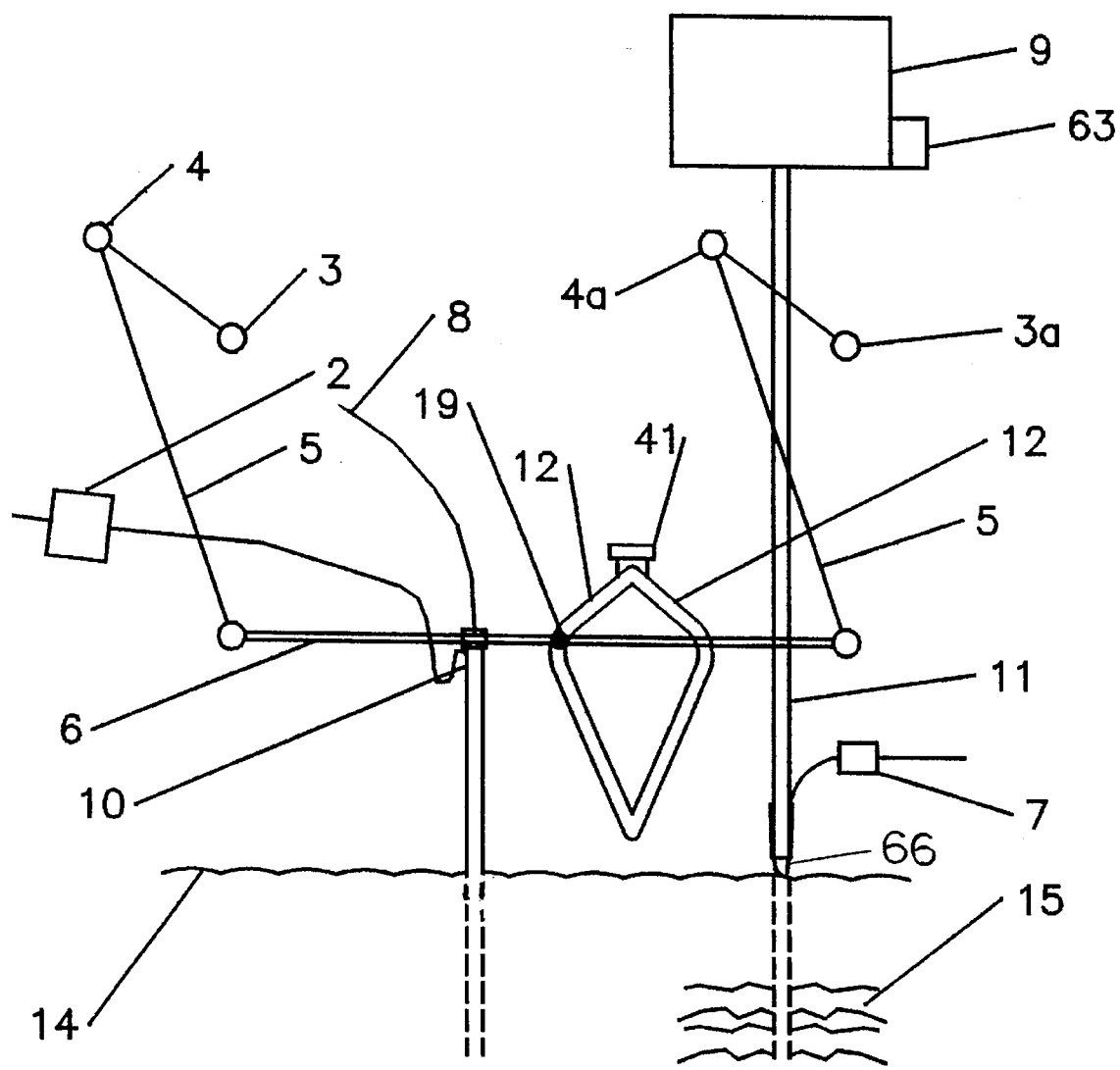
FIG. 2 shows detail indicating perforating and filling operations.

In FIG. 2 we've shown the mechanism whereby tines 10 may be pushed straight down and pulled back up with no injurious bending moment. In the drawing the solid lines show the position of guide pin 19 in raceway 12 as tine 10 connected to tine drive bar or block 6 is just starting to enter the ground. Tine drive block 6 is connected with bearings on each end to connecting rods 5; connecting rods 5 are rotatably connected with throws 4 and 4a in shafts 3 and 3a and rotation of shafts 3 and 3a moves tine drive block 6 up and down. As the machine moves forward the raceway 12 is moving forward and guide pin 19 is moving downward and backward. Pressure on guide pin 19 in its drive roller is essentially straight downward since as raceway 12 moves forward guide pin 19 moves backward in raceway 12. Thus when the unit is in the position wherein the tine 10 is fully inserted, guide pin 19 is at a point where it will move backward due to the shape of raceway 12 as tine 10 is being pulled out and raceway 12 is moving forward. The forward speed of the machine is synchronized with the crankshaft speed and with the raceway 12 shaped as indicated the tines 10 will be pushed straight in and pulled straight out while the machine is in motion. A position sensor (not shown) activates solenoid valve 2 to admit air into tine 10 just as tine 10 starts to enter the ground thereby ejecting core forming material through line 8 as the tine is pushed downward. As the tine reaches maximum depth this air blast causes fracturing and loosening of the ground.

Sand fill line 11 is positioned to be exactly over the last hole drilled just at the point when tine 10 starts into the ground. At this instant solenoid 7 is opened to admit a blast of air to eject sand through slit tip 66 to fill the hole 15. A strain gauge 63 may be used to indicate level of sand in tank 9. Connecting rods 5 connected to throws 4 and 4a on crankshaft 3 and 3a operate tine drive bar 6. Tine 10 is shown just as it starts downward into ground 14.

Figure 3:
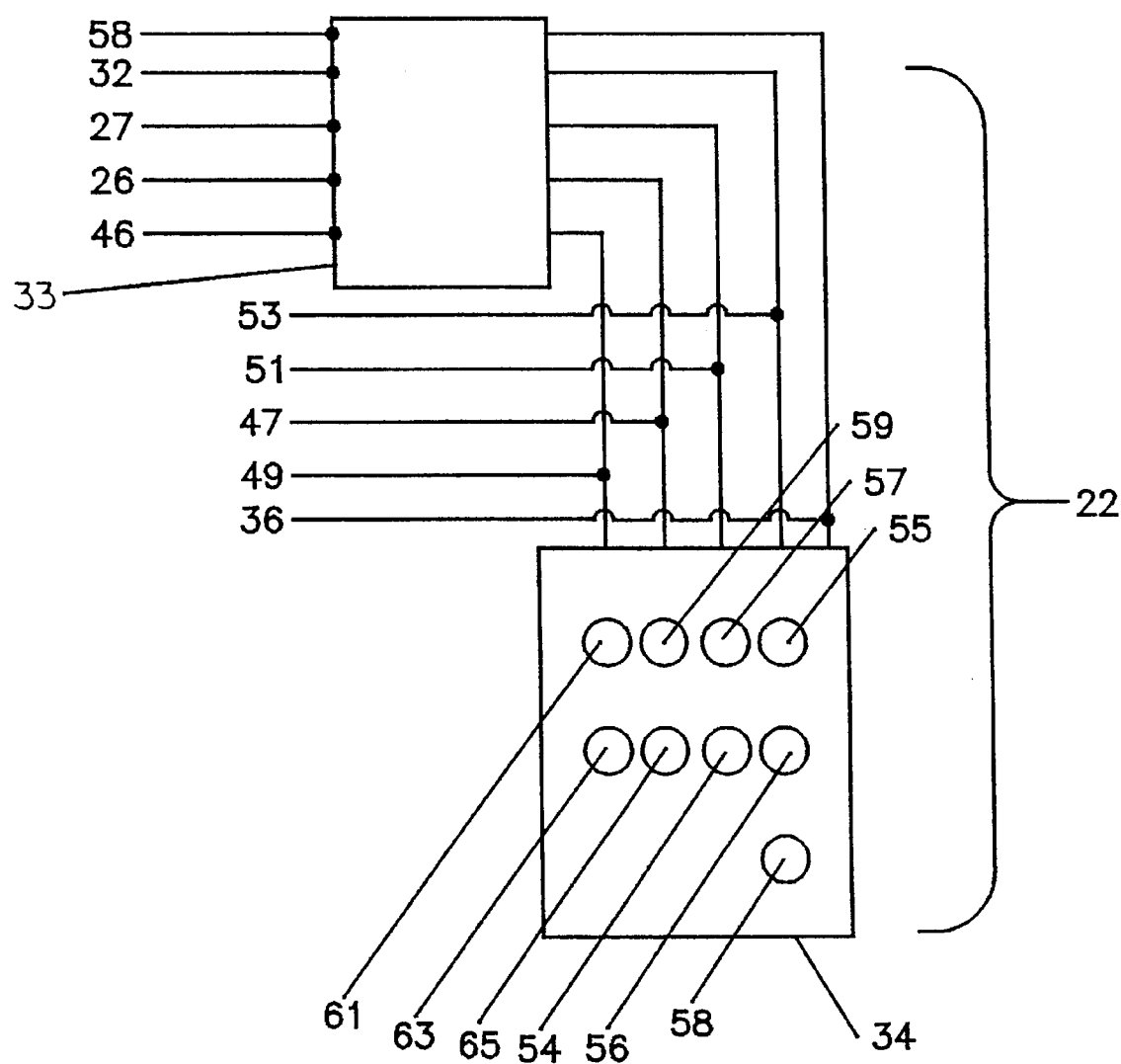
FIG. 3 shows schematic of the control systems.

In FIG. 3 we've shown a central processor 33 and gauge board 34. We have various incoming signals to processor 33 these include drive motor oil pressure 58, forward motion sensor 27, crankshaft motion or rotational speed sensor 26, and sand level gauge 46. A major purpose of the CPU 33 is to directly and exactly synchronize the forward speed of the machine with the crankshaft speed. The processor is also programmed to shut off the wheel drive motors if any of a number of malfunctions occur; these include low oil pressure, tine switches indicating trouble, low sand level.

Other functions include synchronizing operation of air solenoid 2 with tine position and the operation of air solenoid 7 with the sand fill tube position. Outgoing signal 53 controls air to the tine solenoid, outgoing signal 51 controls crankshaft speed, outgoing signal 47 controls forward speed, either manually or from the processor unit, outgoing signal 36 controls air to the sand fill solenoid and outgoing signal 49 controls hydraulic lift 13, FIG. 1.

On the gaugeboard 34 there is shown drive motor light 61, forward speed indicator 59, motor start switch 57, air compressor start switch 55, sand level gauge 63, hydraulic motor discharge pressure 65, fuel gauge 56, treatment hopper level 54, hydraulic motor switch and light 57 and motor oil pressure 58.

I claim:

1. A machine for revitalizing golf course greens comprising:
   a) a body;
   b) an air compressor, a body propelling means, a sand fill tank, a hydraulic system, a drivers seat, an instrument system and an instrument panel mounted on said body;
   c) flexible tracks mounted to each side of said body; said propelling means comprising separate motor drives to drive each of said flexible tracks;
   d) a vertically movable mounting assembly mounted to said body driven by said hydraulic system;
   e) dual crankshafts, each with a minimum of four approximately five inch throws mounted in said mounting assembly;
   f) raceways in a modified diamond shape rigidly mounted to said mounting assembly below said throws;
   g) connecting rods connected on a first end to each of said throws;
   h) tine drive blocks with a guide roller and a guide pin in said roller, and bearings on each of said tine drive blocks; said connecting rods being connected on a second end to said bearings; and with said guide roller running in said raceway, movement of said tine block is guided to put pressure directly downward and directly upward as said tine block is moved upward and downward by rotation of said throws while said raceway and said throws on said crankshafts in said mounting assembly are being moved forward by forward movement of said machine;
   i) a hollow coring tine mounted to each of said tine drive blocks;
   j) an air powered core ejection means connected from said air compressor to near a tip end of each of said hollow coring tines with air flow controlled to eject core material from said hollow coring tines as said tines are moving downward; said airflow fracturing the surrounding soil as said hollow coring tines reach a maximum depth;
   k) a sand fill tube means mounted in said mounting assembly to blow sand into each hole formed by said hollow coring tines;
   l) a crimp and tamping means mounted in said movable mounting assembly to crimp and tamp said sand in each of said holes while said machine is moving;
   m) a first speed sensor means to sense forward speed of said machine;
   n) a speed sensing means to sense rotational speed of said crankshaft and an automatic means to control ratio of said forward speed to said crankshaft rotational speed;
   o) sensing and display means to indicate malfunction of said coring tines, said sand fill tube, said crankshaft, said air compressor or said propelling means, and further to indicate forward speed, operating time, said fill tank level, and hydraulic oil pressure in said hydraulic system.

2. A machine for revitalizing golf course greens comprising:
   a) a body with means for steerably propelling said body over the ground;
   b) a movable mounting assembly means mounted on said body;
   c) a hollow coring tine means mounted on said movable mounting assembly means to repeatedly insert a plurality of tines straight downwardly into and straight upwardly out of the ground such that approximately ten inch holes are inserted into the ground;
   d) a solids material fill tank and a means for filling said holes with said solid material mounted on said movable mounting assembly means, said means for filling said holes operating to fill said holes with material immediately after said holes are formed by said hollow coring tine means;
   e) an air compressor on said body to supply pressurized air to said hollow coring tine means and said means for filling holes, said air compressor connected to said hollow coring tine means to eject a core from said tines and to fracture the ground around said tines as said hollow coring tine means is moved downward;
   f) a hydraulic system on said body to provide movement to said movable mounting assembly means; and g) instrumentation means mounted on said body to coordinate forward speed of said body with operational speed of said hollow coring tine means.

3. The machine for revitalizing golf course greens as in claim 2 wherein said instrumentation means further includes sensing and display means to sense and indicate malfunction of said hollow coring tine means, said air compressor and said means for propelling and further to sense and indicate forward speed, operating time, said fill tank level and hydraulic pressure of said hydraulic system.

4. The machine for revitalizing golf course greens as in claim 2 wherein said core ejected from said hollow coring tine means is ejected into a tank mounted on said body.

* * * * *